US009469304B2

(12) United States Patent
Morita et al.

(10) Patent No.: US 9,469,304 B2
(45) Date of Patent: Oct. 18, 2016

(54) VEHICULAR SYSTEM

(71) Applicant: FUJITSU TEN LIMITED, Kobe-shi, Hyogo (JP)

(72) Inventors: Kyohei Morita, Kobe (JP); Noriaki Inoue, Kobe (JP); Kazuyoshi Kasai, Kobe (JP); Yusuke Iguchi, Kobe (JP)

(73) Assignee: FUJITSU TEN LIMITED, Kobe (JP)

( * ) Notice: Subject to any disclaimer, the term of this patent is extended or adjusted under 35 U.S.C. 154(b) by 0 days.

(21) Appl. No.: 14/285,082

(22) Filed: May 22, 2014

(65) Prior Publication Data
US 2014/0358325 A1 Dec. 4, 2014

(30) Foreign Application Priority Data

May 31, 2013 (JP) ................. 2013-114813

(51) Int. Cl.
*B60W 50/00* (2006.01)
*B60K 35/00* (2006.01)

(52) U.S. Cl.
CPC .......... *B60W 50/0098* (2013.01); *B60K 35/00* (2013.01); *B60K 2350/962* (2013.01); *B60K 2350/967* (2013.01); *B60W 2050/0063* (2013.01); *B60W 2050/0075* (2013.01)

(58) Field of Classification Search
CPC B60W 50/00; B60W 30/00; G05D 2201/00; G06F 9/48; G06F 9/4812; G06F 9/4818; G06F 9/4831; G06F 9/268; G06F 9/46; G06F 9/45512; G06F 9/44521
See application file for complete search history.

(56) References Cited

U.S. PATENT DOCUMENTS

| | | | | |
|---|---|---|---|---|
| 5,438,677 A | * | 8/1995 | Adams | ................. G06F 9/4818 710/262 |
| 2002/0078257 A1 | * | 6/2002 | Nishimura | ..................... 709/318 |
| 2003/0154319 A1 | * | 8/2003 | Araki et al. | .................. 709/310 |
| 2005/0210326 A1 | * | 9/2005 | Nishimura et al. | ............. 714/22 |
| 2005/0234603 A1 | * | 10/2005 | Bale et al. | ........................ 701/2 |
| 2006/0226702 A1 | * | 10/2006 | Ando | ............................. 307/9.1 |
| 2010/0063680 A1 | * | 3/2010 | Tolstedt | ................... G05D 1/12 701/41 |
| 2011/0125601 A1 | * | 5/2011 | Carpenter et al. | ........... 705/26.1 |
| 2013/0066526 A1 | * | 3/2013 | Mondragon | ............. G09G 5/00 701/48 |
| 2014/0092047 A1 | * | 4/2014 | Nara et al. | .................... 345/173 |
| 2014/0106726 A1 | * | 4/2014 | Crosbie | ................ H04W 4/046 455/418 |
| 2014/0229326 A1 | * | 8/2014 | Carpenter et al. | ........... 705/26.7 |

FOREIGN PATENT DOCUMENTS

| | | | |
|---|---|---|---|
| JP | 2007317117 A | * | 12/2007 |
| JP | A-2012-83981 | | 4/2012 |
| JP | A-2012-117967 | | 6/2012 |

* cited by examiner

*Primary Examiner* — Rodney Butler
(74) *Attorney, Agent, or Firm* — Oliff PLC

(57) ABSTRACT

A use specifying unit specifies a "purpose of use" of a vehicle based on a running-data table. An application selection unit selects one or more information-related applications which are suitable for the "purpose of use", from a plurality of information-related applications. Then, an execution inhibition unit inhibits execution of information-related applications which are not selected to be suitable for the specified purpose of the vehicle. As a result, it is possible to prevent information-related applications which are unnecessary for the "purpose of use" of the vehicle from being executed wastefully.

13 Claims, 12 Drawing Sheets

| DRIVING ID | DATE | DAY | DEPARTURE TIME | ARRIVAL TIME | DEPARTURE PLACE | DESTINATION | PURPOSE OF USE |
|---|---|---|---|---|---|---|---|
| A01234 | 2013/05/10 | FRIDAY | 07:02 | 08:12 | HOME | OFFICE | COMMUTATION |
| A01235 | 2013/05/10 | FRIDAY | 18:22 | 19:30 | OFFICE | HOME | COMMUTATION |
| A01236 | 2013/05/11 | SATURDAY | 14:03 | 14:21 | HOME | SUPERMARKET | SHOPPING |
| A01237 | 2013/05/11 | SATURDAY | 15:26 | 15:44 | SUPERMARKET | HOME | SHOPPING |
| A01238 | 2013/05/12 | SUNDAY | 09:12 | 09:58 | HOME | ZOO | RECREATION |
| ... | ... | ... | ... | ... | ... | ... | ... |

FIG.5

| PURPOSE OF USE | BUSINESS MAIL | PARKING INFORMATION | SCHEDULE | BUSINESS NEWS | COUPONS | SEARCH FOR SHOPS | ... } Rb |
|---|---|---|---|---|---|---|---|
| COMMUTATION | NEEDED | — | NEEDED | NEEDED | — | — | ... |
| BUSINESS TRIP | NEEDED | NEEDED | NEEDED | NEEDED | — | — | ... |
| SHOPPING | — | — | — | — | NEEDED | NEEDED | ... |
| TRANSPORTATION | — | NEEDED | NEEDED | — | — | NEEDED | ... |
| RECREATION | — | — | NEEDED | — | — | NEEDED | ... |
| ... | ... | ... | ... | ... | ... | ... | ... |
| OTHER | NEEDED | NEEDED | NEEDED | NEEDED | NEEDED | NEEDED | ... |

VEHICULAR SYSTEM

BACKGROUND OF THE INVENTION

1. Field of the Invention

The present invention relates to a technique for executing an application in a vehicle.

2. Description of the Background Art

In recent years, execution of various kinds of applications in a vehicular system used in a vehicle, such as a navigation system, has been suggested. In one specific example of such suggestion, a plurality of applications are installed in a vehicular system beforehand, and a selected one of the plurality of applications is executed in the vehicular system.

Generally, an application which is executable in a vehicular system can be executed when a user of a vehicle (mainly, a driver) points to an icon or the like for the application. Also, the application can be executed when predetermined conditions for execution, for example, running of the vehicle in a specific place, are satisfied. In this manner, necessary information can be automatically provided to a user while driving a vehicle, without the user's consciousness. For instance, by causing an application for business to be executed when a vehicle is located near an office of a user, it is possible to provide information such as business mails and business news to the user. To make plural kinds of applications executable in a vehicular system allows various pieces of information to be provided to a user of a vehicle.

Meanwhile, in a case where plural kinds of applications are made executable, not only information necessary to a user, but also information unnecessary to the user may probably be provided to the user by execution of those applications.

For example, while a user is driving a vehicle for recreation, it is likely that an application for business is automatically executed and so information regarding business is provided to the user when the vehicle coincidentally runs in the neighborhood of the user's office. In the case where many applications are made executable, information which is unnecessary for a purpose of use of a vehicle is often provided to a user. Such provision of unnecessary information to a user at many times makes the user uncomfortable, so that the degree of the user's concentration on driving may possibly be lowered.

Further, in the case where many applications are made executable, there arises a need to display many icons on a screen in order to give instructions for execution of the many applications. As a result, when a user desires to execute a certain application, it takes much time for a user to find out an icon corresponding to the desired certain application, so that the degree of the user's concentration on driving may possibly be lowered.

SUMMARY OF THE INVENTION

According to one aspect of the present invention, a vehicular system used in a vehicle includes: a controller configured to (i) specify a purpose of use of the vehicle, (ii) select one or more applications which are suitable for the specified purpose of use of the vehicle, from a plurality of applications, and (iii) inhibit execution of applications which are not selected to be suitable for the specified purpose of the vehicle, out of the plurality of applications.

As execution of the applications which are not selected is inhibited, it is possible to prevent the applications unnecessary for a purpose of use of the vehicle from being executed wastefully.

According to another aspect of the present invention, the controller estimates the purpose of use of the vehicle based on information about the vehicle before running of the vehicle.

A purpose of use of the vehicle is estimated based on the information about the vehicle before running, which eliminates a need of complicated operations of the user for specifying a purpose of use of the vehicle.

According to another different aspect of the present invention, the plurality of applications include driving-related applications which are related to driving of the vehicle and driving-unrelated applications which are not related to driving of the vehicle, and the controller does not inhibit execution of the driving-related applications and inhibits execution of some of the driving-unrelated applications which are not selected to be suitable for the specified purpose of the vehicle.

As execution of the driving-related applications is not inhibited, it is possible to reliably provide functions regarding driving of the vehicle, irrespective of a purpose of use of the vehicle Therefore, it is an object of the present invention to prevent an application unnecessary for a purpose of use of a vehicle from being executed wastefully.

These and other objects, features, aspects and advantages of the present invention will become more apparent from the following detailed description of the present invention when taken in conjunction with the accompanying drawings.

BRIEF DESCRIPTION OF THE DRAWINGS

FIG. 5 shows an example of a running data table.

FIG. 6 shows an example of an application data table.

DESCRIPTION OF THE EMBODIMENTS

Hereinafter, preferred embodiments of the present invention will be described with reference to the accompanying drawings.

1. First Preferred Embodiment

<1-1. Overview of Communications System>

Figure 1:
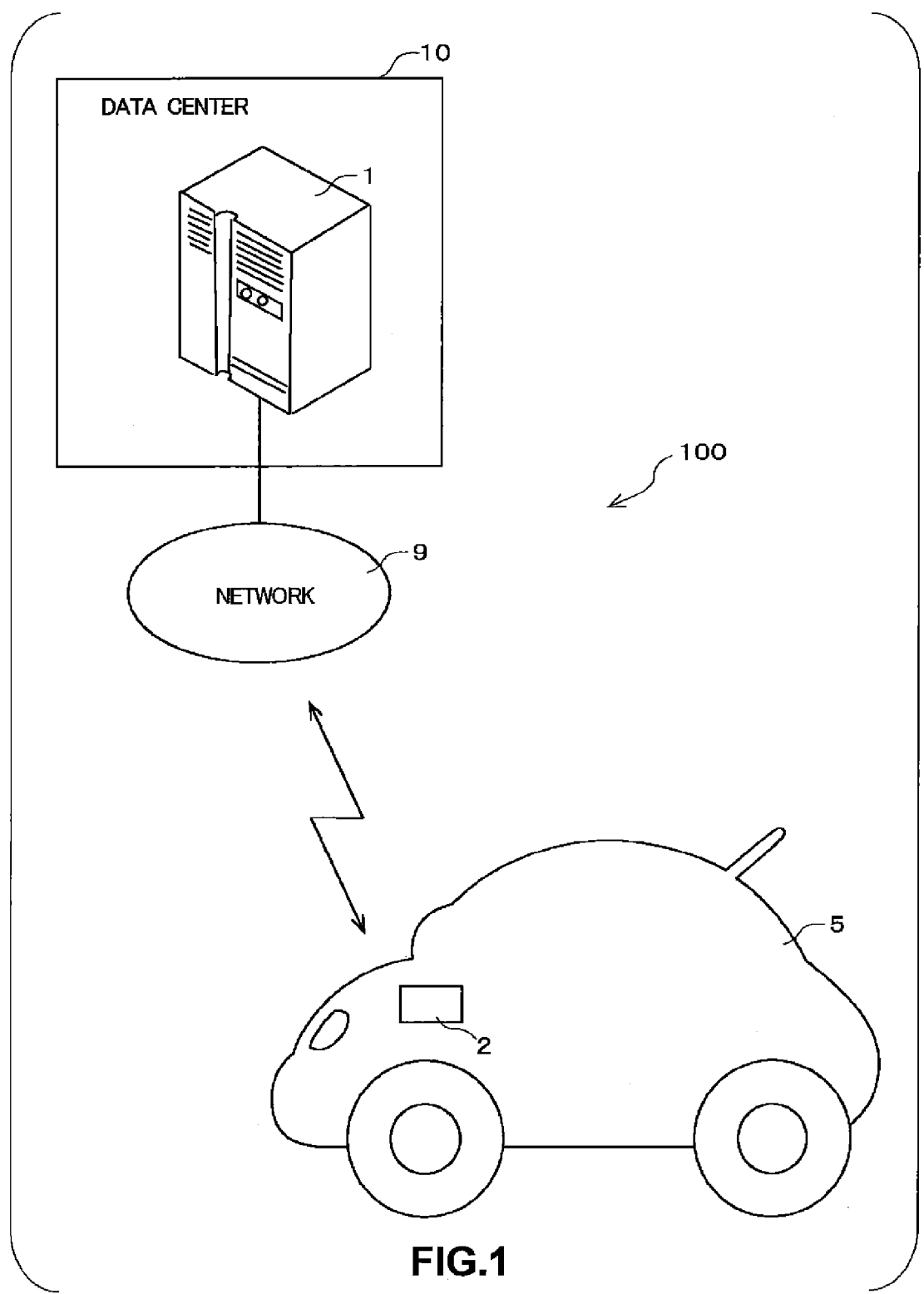
FIG. 1 is a schematic view of a communications system according to a first preferred embodiment.

FIG. 1 is a schematic view of a communications system 100 according to a first preferred embodiment. The communications system 100 includes a server system 1 provided in a data center 10 which is a facility for accumulating data regarding a vehicle 5 such as an automobile, and a vehicle-mounted system 2 which is mounted onto the vehicle 5. The server system 1 and the vehicle-mounted system 2 can communicate with each other via a network 9 such as the Internet.

The vehicle-mounted system 2 is a vehicular system used by a driver, that is, a user, of the vehicle 5, in the vehicle 5. The server system 1 acquires data from the vehicle-mounted system 2, and also provides data to the vehicle-mounted system 2. Though only one vehicle-mounted system 2 is shown in the drawings, the communications system 100 actually includes a plurality of vehicle-mounted systems 2 which are respectively mounted onto different vehicles, and the server system 1 can communicate with each of the plurality of vehicle-mounted systems 2.

When a user drives the vehicle 5, the vehicle-mounted system 2 mounted onto the vehicle 5 sends driving data about the driving, to the server system 1. In the server system 1, driving data received from the vehicle-mounted system 2 is accumulated while being associated with each user. Pieces of driving data about a user's past driving which are accumulated in the server system 1 are used for specifying a purpose of use of the vehicle 5 of the user.

Also, a plurality of applications are made executable in the vehicle-mounted system 2. On the other hand, data indicating applications which are necessary for a purpose of use of the vehicle 5 is registered in the server system 1 for each user. In the vehicle-mounted system 2, after a purpose of use of the vehicle 5 is specified, execution of an application unnecessary for the purpose of use is inhibited based on the registered data in the server system 1. In this manner, an application unnecessary for a purpose of use of the vehicle 5 is kept from being executed wastefully in the vehicle-mounted system 2. Below, a structure of the foregoing communications system 100 and processes performed in the communications system 100 will be described in detail.

<1-2. Structure of Vehicle-Mounted System>

Figure 2:
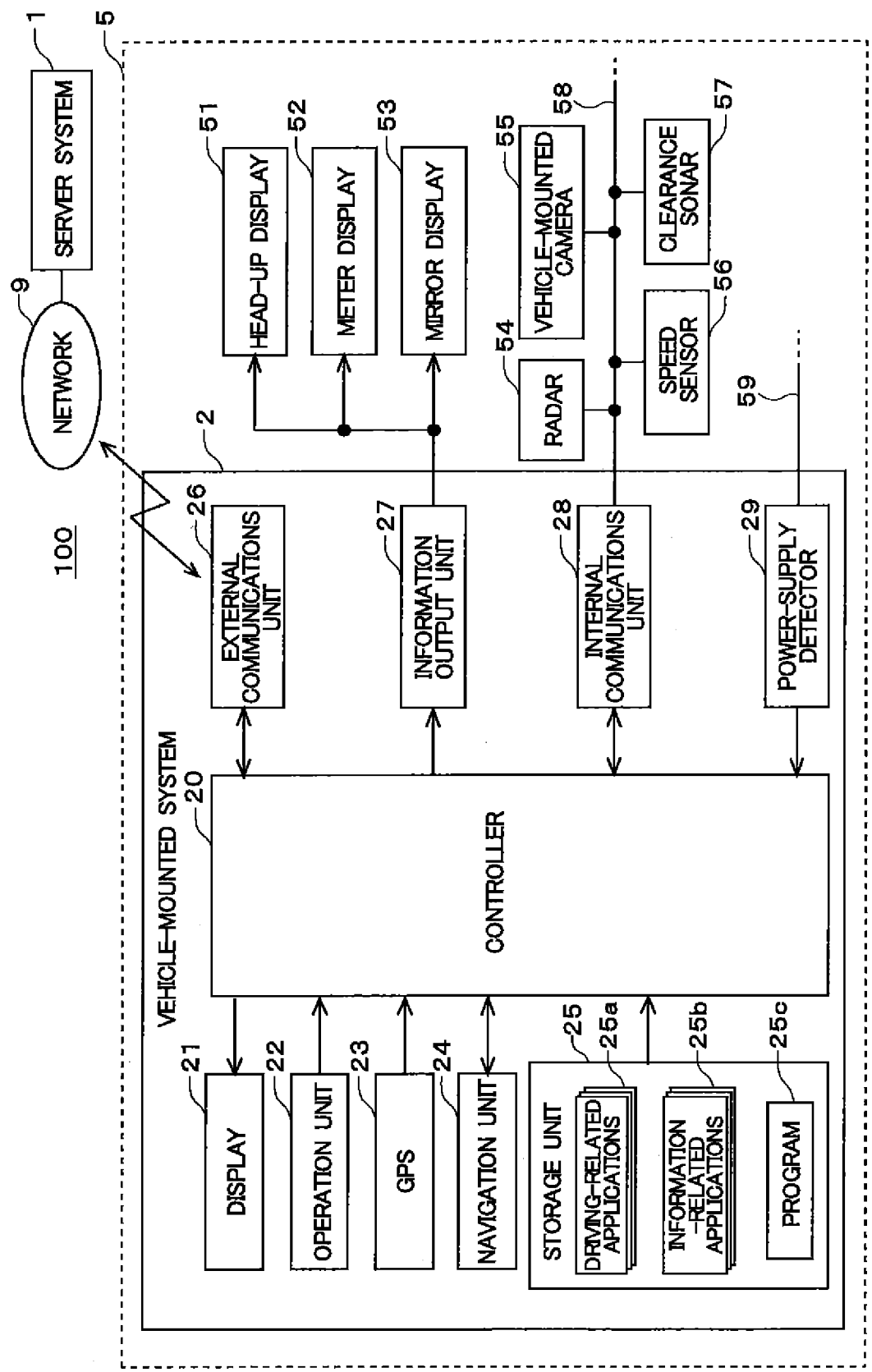
FIG. 2 shows a structure of a vehicle-mounted system.

First, a structure of the vehicle-mounted system 2 will be described. FIG. 2 mainly shows a structure of the vehicle-mounted system 2. The vehicle-mounted system 2 is a navigation system, for example, and includes a controller 20, a display 21, an operation unit 22, a GPS 23, and a navigation unit 24. The controller 20 is a microcomputer including a CPU, a RAM, a ROM, and a timing circuit, for example, and controls the whole of the vehicle-mounted system 2.

The display 21 is a display device including a thin display panel composed of liquid crystal or the like, for example, and displays various kinds of information and images. The display 21 is placed on an instrument panel of the vehicle 5 or the like so that a user can visually recognize a screen thereof.

The operation unit 22 is a member which accepts an operation of a user. The operation unit 22 includes an operation button that a user can physically operate, and a touch panel which is overlaid on the screen of the display 21. A user can give various kinds of instructions to the vehicle-mounted system 2 by pointing at an icon or a command button appearing on the screen of the display 21 via the touch panel.

The GPS 23 acquires position information indicating a position of the vehicle 5. The GPS 23 receives signals from a plurality of satellites and acquires the position of the vehicle 5 in terms of latitude and longitude.

The navigation unit 24 fulfills a navigation function of indicating a route from a current position of the vehicle 5 to a destination set by the user, with the use of the position information acquired by the GPS 23. The vehicle-mounted system 2 functions as a navigation system by virtue of inclusion of the navigation unit 24.

Further, the vehicle-mounted system 2 includes an external communications unit 26, an information output unit 27, an internal communications unit 28, and a power-supply detector 29.

The external communications unit 26 has a communications capability using wireless communications standards such as LTE or WiMAX, and carries out communications via the network 9. The vehicle-mounted system 2 is allowed to send/receive data to/from the server system 1 by the external communications unit 26. Also, the external communications unit 26 can acquire information from not only the server system 1 of the communications system 100, but also the other server systems connected to the network 9.

The information output unit 27 sends information which should be provided to a user (such information will hereinafter be referred to as "guide information") to a display device provided outside the vehicle-mounted system 2, and causes the display device to display the sent guide information. In the vehicle 5, a plurality of display devices such as a head-up display 51, a meter display 52, and a mirror display 53 are provided so as to be visually recognized by a user. The information output unit 27 can output guide information to a selected display device out of the plurality of display devices, and cause the selected display device to display the guide information.

The head-up display 51 is a display device which projects information on a glass plate or the like, to thereby display the information while superposing the information on the field of view of a user who is driving. The meter display 52 is a display device included in a meter panel of the vehicle 5. Further, the mirror display 53 is a display device included in a rear-view mirror of the vehicle 5.

While driving the vehicle 5, a user moves a line of vision thereof in the smallest amount when perceiving guide information displayed on the head-up display 51. Then, the amount of travel of a line of vision which is required for a user to perceive guide information displayed on each display device increases in order of the head-up display 51, the meter display 52, the display 21 of the vehicle-mounted system 2, and the mirror display 53. In other words, the head-up display 51, the meter display 52, the display 21 of the vehicle-mounted system 2, and the mirror display 53 are in order of decreasing a user's ease in perceiving guide information displayed thereon.

Also, the information output unit 27 can output an audio signal to a speaker (not shown) provided in the interior of the vehicle 5, and provide guide information to a user in voice via the speaker.

The internal communications unit 28 is connected to a vehicle-mounted network 58 such as CAN, and communicates with the other electronic devices provided in the vehicle 5. The vehicle-mounted network 58 is connected with electronic devices such as a radar 54, a vehicle-mounted camera 55, a speed sensor 56, and a clearance sonar 57, for example. Thus, the internal communications unit 28 can receive data transmitted from those electronic devices 54, 55, 56, and 57 via the vehicle-mounted network 58.

The radar 54 detects an object present in the front and rear of the vehicle 5, and sends a result of detection to the vehicle-mounted system 2. The vehicle-mounted camera 55 acquires an image showing a state around the vehicle 5 and an image showing a state inside the vehicle 5, and sends those images to the vehicle-mounted system 2. The speed sensor 56 senses a running speed of the vehicle 5, and sends the running speed to the vehicle-mounted system 2. Further, the clearance sonar 57 detects an object present in the neighborhood of the vehicle 5, and sends a result of detection to the vehicle-mounted system 2.

The power-supply detector 29 detects a status of a power-supply line 59 of the vehicle 5, such as ACC. The vehicle-mounted system 2 is supplied with power from the power-supply line 59. Accordingly, the vehicle-mounted system 2 is actuated when the power-supply line 59 is energized, and stops operating when the power-supply line 59 is non-energized. Under normal conditions, the vehicle 5 is ready to run (an engine starts) when the power-supply line 59 is energized, and the vehicle 5 is unable to run (an engine stops) when the power-supply line 59 is non-energized.

Further, the vehicle-mounted system 2 includes a storage unit 25 in which various kinds of information necessary for operations of the vehicle-mounted system 2 are stored. The storage unit 25 is a non-volatile storage device such as a flash memory, for example. In the storage unit 25, a program 25*c* for control is stored. The CPU of the controller 20 executes the program 25*c* (i.e., carries out a calculation process in accordance with the program 25*c*), so that respective functional elements required to form the controller 20 are implemented. Details of the functional elements of the controller 20 which are implemented by execution of the program 25*c* for control will be later provided.

In the storage unit 25, programs of driving-related applications 25*a* and information-related applications 25*b* are further stored. The driving-related applications 25*a* and the information-related applications 25*b* are installed in the vehicle-mounted system 2, and are executable in the vehicle-mounted system 2. Installation of such applications is accomplished by downloading the applications from a predetermined server system connected with the network 9.

The driving-related applications 25*a* include a plurality of applications, and also the information-related applications 25*b* include a plurality of applications. When any of the applications included in either the driving-related applications 25*a* or the information-related applications 25*b* is executed, a function corresponding to the executed application is fulfilled in the vehicle-mounted system 2.

The driving-related applications 25*a* are driving-related applications which are related to driving of the vehicle 5, and provide guide information and functions which are necessary for driving, to a user. The driving-related applications 25*a* include applications (a1), (a2), (a3), (a4), (a5), and (a6) as follows, for example. However, the applications (a1), (a2), (a3), (a4), (a5), and (a6) are mere examples, and the driving-related applications 25*a* can include any other application than the applications (a1), (a2), (a3), (a4), (a5), and (a6).

Application (a1) for detection of pedestrians: this application detects a pedestrian around the vehicle 5 based on an image of an area in front of the vehicle 5 or the like, and provides guide information indicating presence of a pedestrian, if any, to a user.

Application (a2) for determination of deviation from lane: this application determines whether or not the vehicle 5 deviates from a lane based on an image of an area in front of the vehicle 5 or the like, and provides guide information indicating deviation from a lane, if it happens, to a user.

Application (a3) for determination of a distance between two vehicles: this application derives a distance between the vehicle 5 and a vehicle running ahead of the vehicle 5 based on a result of detection provided from the radar 54 or the like, and provides guide information indicating that a distance between two vehicles is smaller than a standard, if it is so, to a user.

Application (a4) for determination of a speed at a curve: while the vehicle 5 is running short of a curve, this application provides guide information indicating that a running speed is higher than a standard, if it is so, to a user.

Application (a5) for prevention of looking aside while driving: this application detects a direction of a line of vision of a user based on an image of the interior of the vehicle 5 or the like, and provides guide information indicating that the line of vision of the user is not directed toward a front area of the vehicle 5, if it is so, to the user.

Application (a6) for detection of an approaching object: this application detects an object which approaches the vehicle 5 based on a result of detection provided by the clearance sonar 57 or the like, and provides guide information indicating presence of an approaching object, if any, to a user.

In contrast thereto, the information-related applications 25*b* are driving-unrelated applications which are not related to driving of the vehicle 5, and provide various kinds of guide information and functions which are not related to driving, to a user. The information-related applications 25*b* acquire information from various server systems connected with the network 9 with the use of the external communications unit 26 as needed, and provide the acquired information to a user, as guide information. The information-related applications 25*b* include applications (b1), (b2), (b3), (b4), (b5), and (b6) as follows, for example. However, the applications (b1), (b2), (b3), (b4), (b5), and (b6) are mere examples, and the information-related applications 25*b* can include any other application than the applications (b1), (b2), (b3), (b4), (b5), and (b6).

Application (b1) for business mail: this application provides guide information indicating details of an e-mail to an address used for business, to a user, in voice.

Application (b2) for information about parking area: this application provides guide information indicating a crowding level of a parking area such as a service plaza, to a user.

Application (b3) for schedule: this application provides guide information indicating details of a schedule of a user, to the user, in voice.

Application (b4) for business news: this application provides guide information indicating details of news regarding business, to a user, in voice.

Application (b5) for acquisition of coupons: this application acquires a coupon which is available in a shop that a user uses, and provides guide information indicating details of the coupon, to the user.

Application (b6) for search for shops: this application searches for a shop which sells an item wanted by a user at a low price, and provides guide information indicating a result of search, to the user.

The driving-related applications 25*a* are executed immediately when the engine of the vehicle 5 starts and the vehicle 5 becomes ready to run. In contrast thereto, the information-related applications 25*b* are executed when predetermined conditions for execution are satisfied. Such conditions for execution of the information-related applications 25*b* are set differently depending on each of the applications included in the information-related applications 25*b*. For example, with respect to the applications for business mail and business news, the conditions for execution thereof are satisfied when the vehicle 5 is located in the neighborhood of an office of a user. Thus, when a user drives the vehicle 5 toward his office for work, the applications for business mail and business news are automatically executed, so that the user can grasp details of e-mails and news regarding business before arriving at his office.

Figure 3:
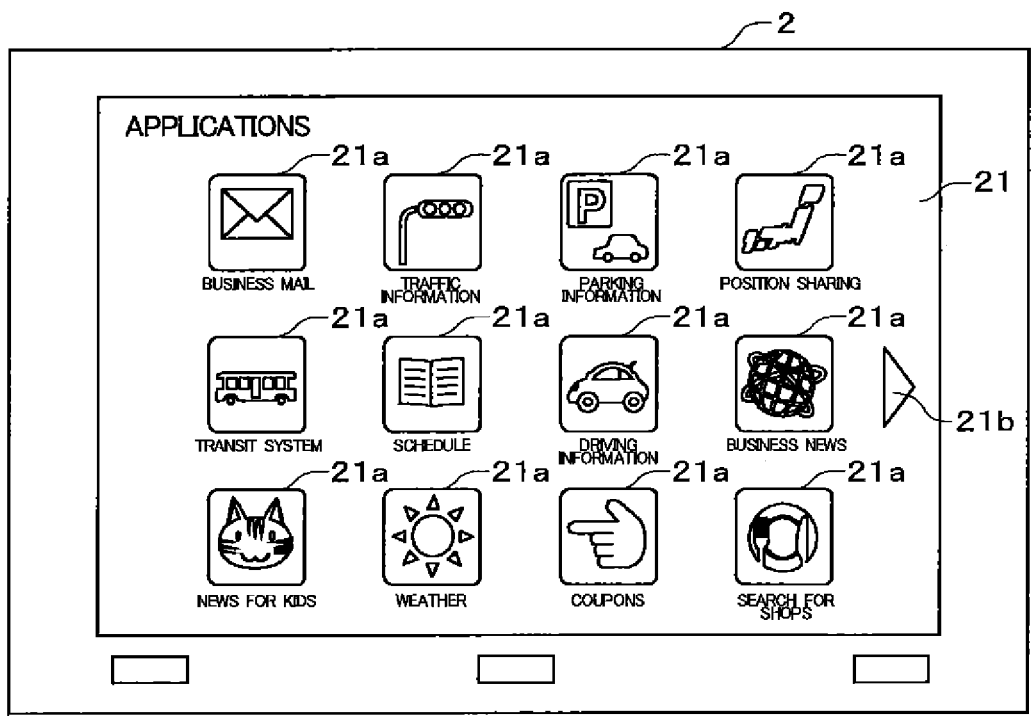
FIG. 3 shows an example of an application selection screen.

Further, the information-related applications 25b are executed also when a user gives instructions for execution via the operation unit 22. FIG. 3 shows an example of an application selection screen appearing on the display 21 for a user to give instructions for execution of the information-related applications 25b. The application selection screen appears as a result of performance of a predetermined operation using the operation unit 22.

As shown in FIG. 3, on the application selection screen, icons 21a of the information-related applications 25b installed in the vehicle-mounted system 2 are displayed in the form of list. Each of the displayed icons 21a corresponds to one of the information-related applications 25b, and receives instructions for execution of the corresponding information-related application 25b from a user. In a case where the number of the information-related applications 25b is so large that all of the icons 21a thereof cannot be displayed on one screen, a shift button 21b is displayed at the end of the application selection screen. When a user points to the shift button 21b via the touch panel, the icons 21a displayed on the application selection screen are changed.

When a user desires to execute a certain one of the information-related applications 25b, the user finds out the icon 21a of the certain information-related application 25b in the application selection screen, and points to the icon 21a via the touch panel. In this manner, the information-related application 25b corresponding to the pointed icon 21a can be executed. Additionally, icons corresponding to the driving-related applications 25a are not displayed on the application selection screen because the driving-related applications 25a are executed at a point of time when the vehicle 5 becomes ready to run.

<1-3. Structure of Server System>

Figure 4:
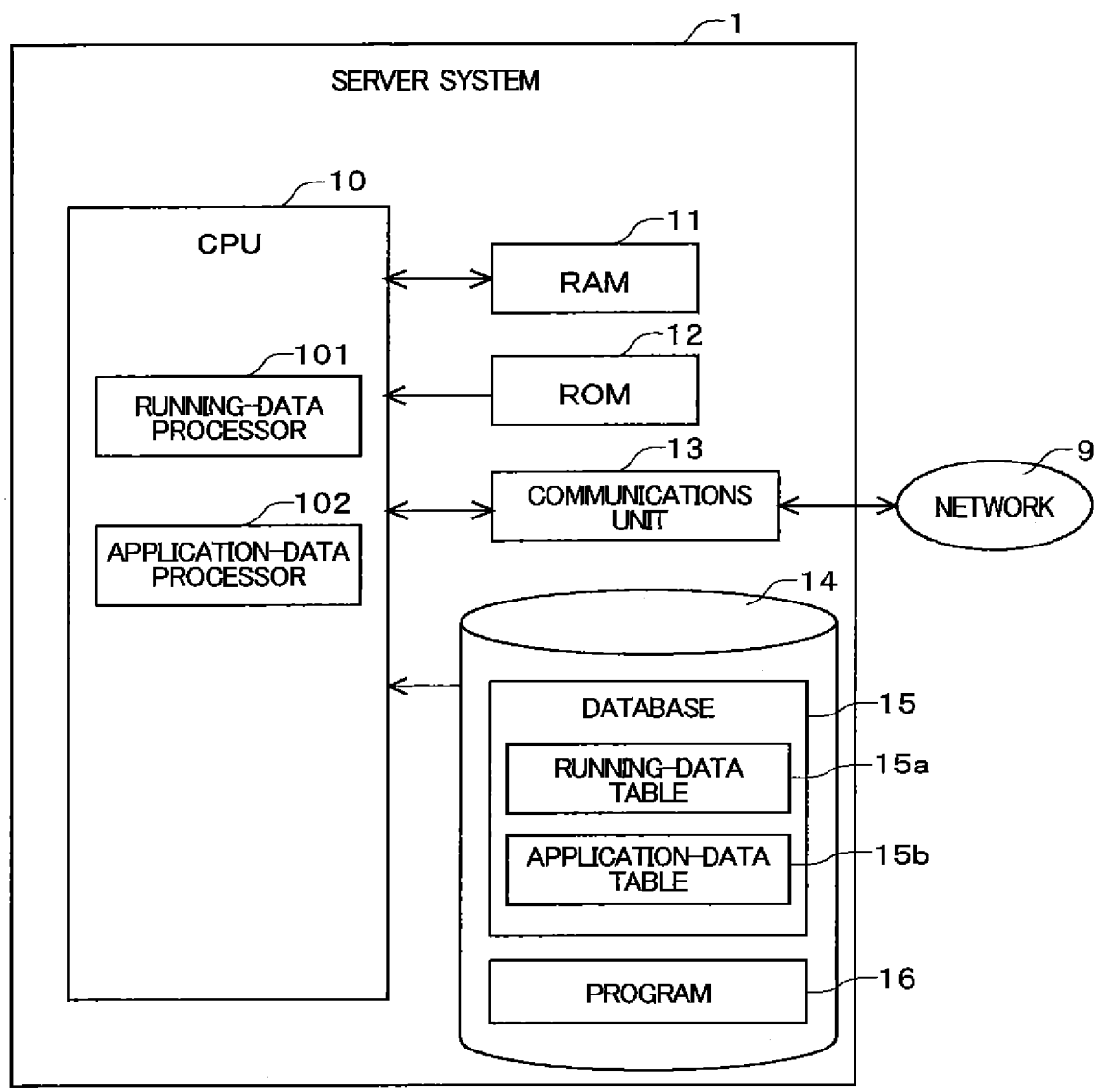
FIG. 4 shows a structure of a server system.

Next, a structure of the server system 1 will be described. FIG. 4 mainly shows the structure of the server system 1. The server system 1 is a computer including a CPU 10, a RAM 11, and a ROM 12. Also, the server system 1 includes a communications unit 13 for carrying out communications via the network 9, and a hard disk 14 which is a non-volatile storage device. The server system 1 is allowed to transmit/receive data to/from the vehicle-mounted system 2 mounted onto the vehicle 5 by the communications unit 13.

In the hard disk 14, a program 16 is stored. As a result of the program 16 being executed by the CPU 11 (in other words, when the CPU 11 carries out a calculation process in accordance with the program 16), functional elements required to form the server system 1 are implemented. A running-data processor 101 and an application-data processor 102 shown in FIG. 4 are parts of the functional elements implemented by execution of the program 16.

In the hard disk 14, also a database 15 is stored. The database 15 includes a running-data table 15a and an application-data table 15b. The running-data table 15a and the application-data table 15b are prepared for each of users of the vehicle-mounted system 2, and are registered in association with identifying information of each user.

The running-data table 15a indicates a state of an associated user's past driving of the vehicle 5. FIG. 5 shows an example of the running-data table 15a. The running-data table 15a includes a plurality of records Ra. Each of the records Ra in the running-data table 15a indicates a state of one time of the associated user's driving of the vehicle 5. Such the record Ra is added every time the user drives the vehicle 5. Accordingly, the running-data table 15a indicates a history of the associated user's past driving.

In each of the records Ra, a "driving ID" for identifying a record Ra, pieces of specific driving data indicating a state of a certain time of driving (such as a date, a day (what day of the week), a departure time, an arrival time, a departure place, and a destination), and a "purpose of use" indicating a purpose of use (a purpose of driving) of the vehicle 5 for the certain time of driving are brought into correspondence with one another. As examples of a "purpose of use", "commutation (commuting to and from office)", "business trip", "shopping", "transportation (taking someone to and from some place", "recreation", and the like are cited.

The driving data is transmitted from the vehicle-mounted system 2 every time a user drives the vehicle 5. The running-data processor 101 (refer to FIG. 4) adds a "driving ID" and a "purpose of use" to the driving data received from the vehicle-mounted system 2, and records the resultant driving data as one record Ra of the running-data table 15a. The running-data processor 101 specifies a "purpose of use" based on the driving data (in particular, "destination") received from the vehicle-mounted system 2. Further, a "purpose of use" in each of the records Ra can be edited by a user with the use of the vehicle-mounted system 2 or the like.

On the other hand, the application-data table 15b indicates the information-related applications 25b which are required by an associated user for each "purpose of use" of the vehicle 5. While various kinds of the information-related applications 25b are installed in the vehicle-mounted system 2 as described above, all of the installed information-related applications 25b are not required by the user, depending on a "purpose of use" of the vehicle 5.

For instance, in a case where a "purpose of use" of the vehicle 5 is "commutation", while the applications for business mail and business news are required, the applications for acquisition of coupons and the applications for search for shops are not required. For this reason, in the application-data table 15b, one or some of the information-related applications 25b which are required by a user are registered for each "purpose of use". Additionally, data about the driving-related applications 25a is not registered in the application-data table 15b.

FIG. 6 shows an example of an application-data table 15b. The application-data table 15b includes a plurality of records Rb. Each of the records Rb in the application-data table 15b corresponds to one "purpose of use", and indicates one or more information-related applications 25b which are necessary for the one "purpose of use".

In each of the records Rb, a "purpose of use" and necessity data indicating whether or not each of the plurality of information-related applications 25b installed in the vehicle-mounted system 2 is necessary correspond to each other. For representation of the necessity data in each of the records Rb, if each of the information-related applications 25b such as the applications for business mail, information about parking area, and schedule is necessary, "NEEDED" is registered. On the other hand, if each of such the above-cited information-related application 25b is unnecessary, "-" is registered. Thus, each of the information-related applications 25b which is indicated to be "NEEDED" in each of the records Rb is the information-related application 25b necessary for the "purpose of use". Moreover, in the record Rb where a "purpose of use" is "OTHER", "NEEDED" is registered as the necessity data for each of all the information-related applications 25b. Such the description of the necessity data in each of the records Rb can be edited by a user with the use of the vehicle-mounted system 2 or the like.

The application-data processor 102 receives a "purpose of use" at a present moment of the vehicle 5, from the vehicle-mounted system 2. Then, the application-data processor 102 refers to the application-data table 15b, and transmits a necessity data corresponding to the "purpose of use" (that is, data indicating one or more information-related applications 2511 necessary for the "purpose of use"), to the vehicle-mounted system 2.

<1-4. Process of Communications System>

Figure 7:
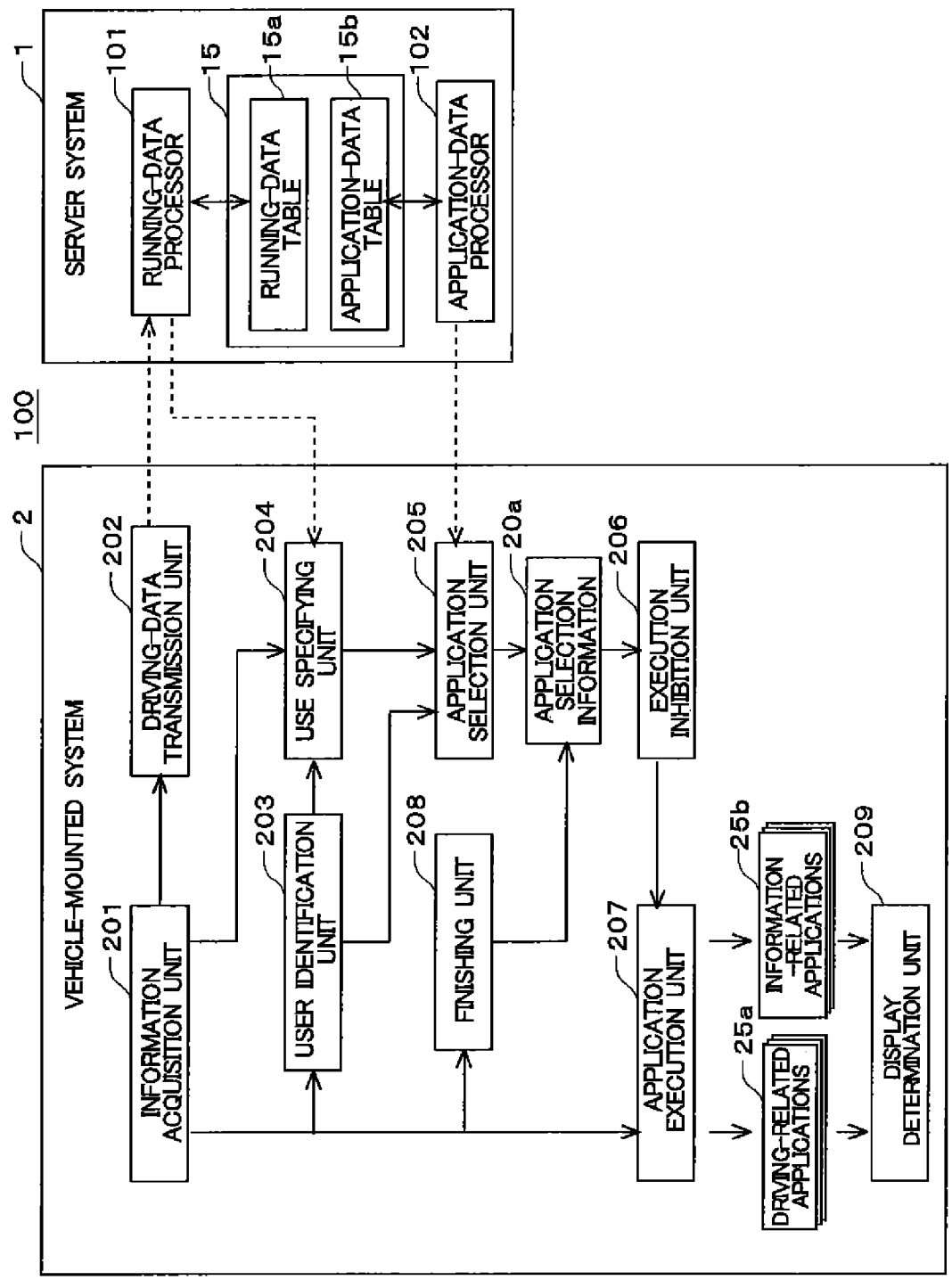
FIG. 7 is a functional diagram of a structure of the communications system according to the first preferred embodiment.

Next, processes performed in the communications system 100 will be described. FIG. 7 is a functional diagram of a structure of the communications system 100, including the functional elements of the controller 20 which are implemented by execution of the program 25c for control (refer to FIG. 2) in the vehicle-mounted system 2. An information acquisition unit 201, a driving-data transmission unit 202, a user identification unit 203, a use specifying unit 204, an application selection unit 205, an execution inhibition unit 206, an application execution unit 207, a finishing unit 208, and a display determination unit 209 which are shown in FIG. 7 are the functional elements of the controller 20 implemented by execution of the program 25c for control.

The information acquisition unit 201 acquires various kinds of information with the use of the timing circuit of the controller 20, the GPS 23, the navigation unit 24, the power-supply detector 29, and the like. The information acquisition unit 201 can acquire information about a time indicated by the timing circuit (a date, a day, and a time), information about a position which is acquired by the GPS 23 (position of the vehicle 5), a destination set on the navigation unit 24, a status of the power-supply line 59 which is detected by the power-supply detector 29, and the like, for example. Further, the information acquisition unit 201 can also acquire a result of detection provided by the radar 54, an image acquired by the vehicle-mounted camera 55, a running speed sensed by the speed sensor 56, a result of detection provided by the clearance sonar 57, and the like, with the use of the internal communications unit 28.

The driving-data transmission unit 202 transmits the information acquired by the information acquisition unit 201 in the above-described manner, to the server system 1, as driving data, with the use of the external communications unit 26 every time a user drives the vehicle 5. The running-data processor 101 registers the driving data transmitted from the vehicle-mounted system 2 in the running-data table 15a.

Figure 8:
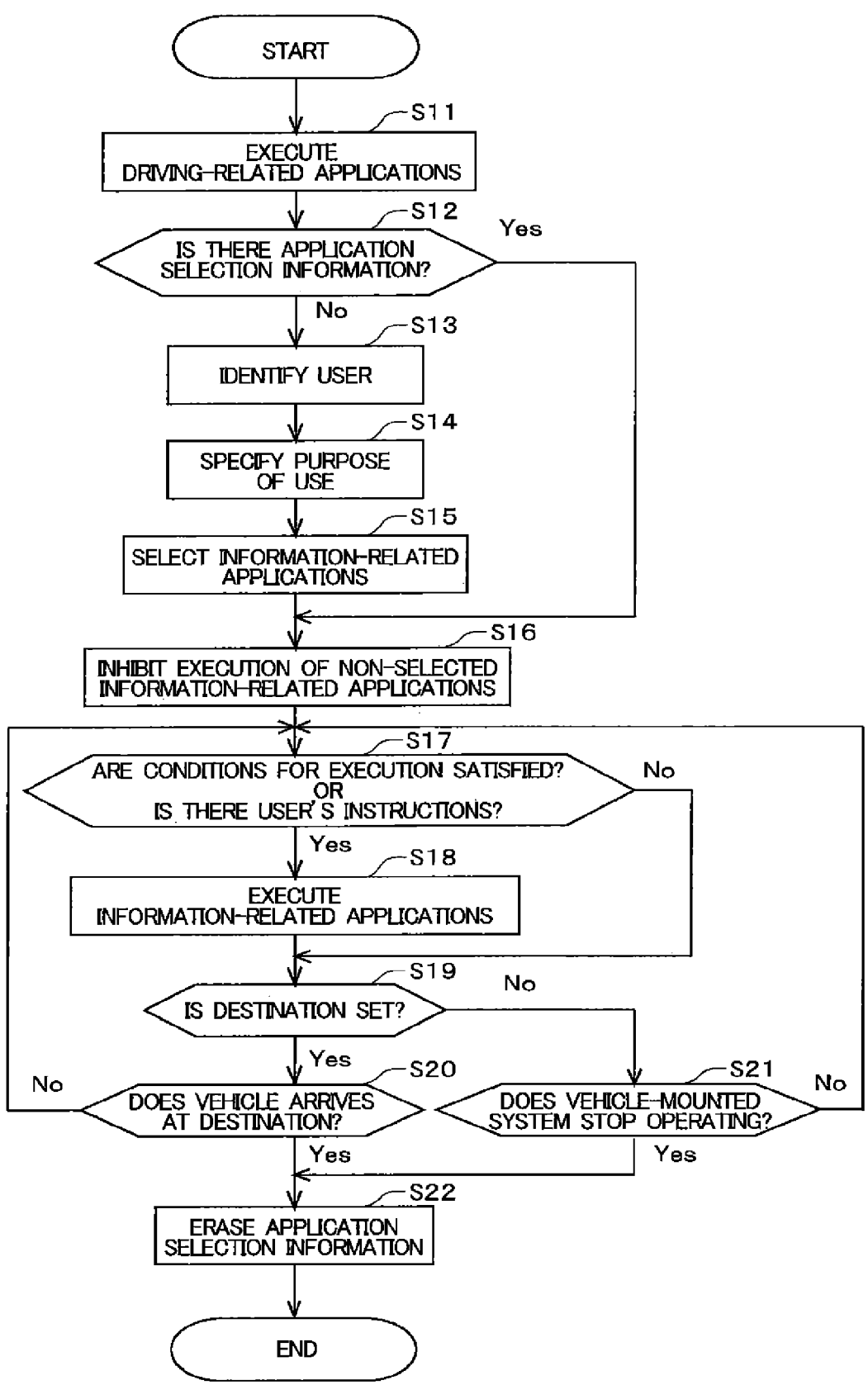
FIG. 8 shows a flow of processes performed in the vehicle-mounted system.

The user identification unit 203, the use specifying unit 204, the application selection unit 205, the execution inhibition unit 206, the application execution unit 207, the finishing unit 208, and the display determination unit 209 perform processes regarding execution of applications. FIG. 8 shows a flow of processes performed in the vehicle-mounted system 2 for execution of applications. Below, a flow of processes performed in the vehicle-mounted system 2 for execution of applications will be described, with reference to FIGS. 7 and 8.

The vehicle-mounted system 2 is actuated when the power-supply line 59 of the vehicle 5 is energized. Upon actuation of the vehicle-mounted system 2, firstly, the application execution unit 207 executes (starts up) all of the driving-related applications 25a (step S11). The time when the vehicle-mounted system 2 is actuated is just after the power-supply line 59 becomes energized, and so, is equal to a time when the engine of the vehicle 5 starts and the vehicle 5 becomes ready to run. Accordingly, the application execution unit 207 executes the driving-related applications 25a substantially at the point of time when the vehicle 5 becomes ready to run. As the application execution unit 207 executes the driving-related applications 25a at the point of time when the vehicle 5 becomes ready to run, guide information and functions which are required for driving can be speedily provided to a user, irrespective of a "purpose of use" of the vehicle 5.

Secondly, it is determined whether or not application selection information 20a which indicates a result of selection of the information-related applications 25b is stored in the storage unit 25 (step S12). If the application selection information 20a is stored, one or some information-related applications 25b which are suitable for a "purpose of use" have been already selected from the plurality of information-related applications 25b installed in the vehicle-mounted system 2, by the application selection unit 205. In this case ("Yes" in the step S12), steps S13, S14, and S15 are omitted, and the flow goes to a step S16.

Unlike this, if the application selection information 20a is not stored ("No" in the step S12), the user identification unit 203 subsequently identifies a user (driver) of the vehicle 5 (step S13). The user identification unit 203 can identify a user based on an image of the interior of the vehicle 5 which is acquired by the vehicle-mounted camera 55, for example. Additionally, in a case where the vehicle 5 is furnished with an identification device which carries out personal identification or biometric identification using an ID card or the like, a user can alternatively be identified by using a result provided by the identification device. Also, the user identification unit 203 can further identify a fellow passenger of the vehicle 5, other than the driver.

Then, the use specifying unit 204 specifies a "purpose of use" of the vehicle 5 of the user identified by the user identification unit 203 (step S14). In order to specify a "purpose of use", the running-data table 15a registered in the server system 1 is utilized.

The use specifying unit 204 transmits a request signal for requesting the running-data table 15a, to the server system 1. The request signal includes identifying information of the user of the vehicle 5 who is identified by the user identification unit 203. In response to the request signal, the running-data processor 101 of the server system 1 selects the running-data table 15a associated with the identification information of the user from the database 15, and transmits the selected running-data table 15a to the vehicle-mounted system 2. As a result, the use specifying unit 204 acquires the running-data table 15a of the user of the vehicle 5 (that is, a history of the user's past driving).

Also, the use specifying unit 204 acquires information about the vehicle 5 before running (namely, information about the vehicle 5 at a present moment), such as a day, a time, and a position, with the use of the information acquisition unit 201. Then, the use specifying unit 204 refers to the running-data table 15a, to estimate a "purpose of use" of the vehicle 5 based on the information about the vehicle 5 before running. For example, the use specifying unit 204 extracts some records Ra each of which includes driving data similar to the information about the vehicle 5 before running, out of the plurality of records Ra registered in the running-data table 15a. The use specifying unit 204 estimates a "purpose of use" of the vehicle 5 based on the degree of similarity between the driving data of the extracted records Ra and the information about the vehicle 5 before running, a frequency of occurrence of a "purpose of use" in the extracted records Ra, and the like.

In a case where a user customarily drives the vehicle 5 for a certain purpose of use, information before running such as a day, a time, and a position is mostly constant in general. For example, in a case where a user customarily drives the vehicle 5 for "a purpose of use" of commutation, a day is a weekday, a time is around 7:00 a.m., and a position is home in most cases. As such, the information about the vehicle 5 before running does not significantly change. On this principle, the use specifying unit 204 can estimate a "purpose of use" of the vehicle 5 based on the information before running and the running-data table 15*a* (a history of a user's past driving).

However, in a case where a "purpose of use" of the vehicle 5 cannot be estimated due to absence of a record Ra similar to the information before running in the running-data table 15*a*, or for the other reasons, the use specifying unit 204 can designate "OTHER" as a "purpose of use". Also, in a case where a user sets a destination for a navigation function, a "purpose of use" of the vehicle 5 may be estimated in consideration of the destination and a route to the destination. Further, in a case where the user identification unit 203 identifies a fellow passenger other than a driver of the vehicle 5, a "purpose of use" of the vehicle 5 may be estimated in consideration of the fellow passenger.

After the use specifying unit 204 specifies a "purpose of use" of the vehicle 5 in the above-described manner, the application selection unit 205 subsequently selects one or more information-related applications 25*b* which are suitable for the "purpose of use", out of the plurality of information-related applications 25*b* installed in the vehicle-mounted system 2 (step S15). For selection of the information-related applications 25*b*, the application-data table 15*b* registered in the server system 1 is utilized.

The application selection unit 205 transmits a request signal which requests data indicating the information-related applications 25*b* which are necessary for the "purpose of use", to the server system 1. The request signal includes the "purpose of use" specified by the use specifying unit 204 and the identifying information of the user of the vehicle 5 who is identified by the user identification unit 203. In response to the request signal, the application-data processor 102 of the server system 1 selects a record Rb corresponding to the "purpose of use" from the application-data table 15*b* associated with the identifying information of the user, and transmits the necessity data of the selected record Rb, to the vehicle-mounted system 2. As a result, the application selection unit 205 acquires the necessity data corresponding to the "purpose of use" (that is, data indicating one or more information-related applications 25*b* which are necessary for the "purpose of use").

The application selection unit 205 selects one or more information-related applications 25*b* which are suitable for the "purpose of use", out of the plurality of information-related applications 25*b* installed in the vehicle-mounted system 2, in accordance with the acquired necessity data. Then, the application selection unit 205 generates the application selection information 20*a* which indicates a result of selection of the information-related applications 25*b*, and stores the application selection information 20*a* into the storage unit 25.

After the application selection information 20*a* is stored as described above, the execution inhibition unit 206 subsequently inhibits execution of non-selected information-related applications 25*b* which are not selected by the application selection unit 205, based on the application selection information 20*a*. On the other hand, the execution inhibition unit 206 permits execution of the information-related applications 25*b* which are selected by the application selection unit 205 (step S16).

More specifically, the execution inhibition unit 206 controls the application execution unit 207 such that the non-selected information-related applications 25*b* are not executed (started). As a result, thereafter, only the information-related applications 25*b* necessary for the "purpose of use" of the vehicle 5 are executed, and the information-related applications 25*b* which are unnecessary for the "purpose of use" of the vehicle 5 are not executed wastefully.

Also, the execution inhibition unit 206 controls the display 21 such that the icons 21*a* of the non-selected information-related applications 25*b* are not displayed on the application selection screen. As a result, only the icons 21*a* of the information-related applications 25*b* necessary for the "purpose of use" of the vehicle 5 are displayed on the application selection screen, and the icons 21*a* of the non-selected information-related applications 25*b* which are unnecessary for the "purpose of use" of the vehicle 5 are not displayed.

Figure 9:
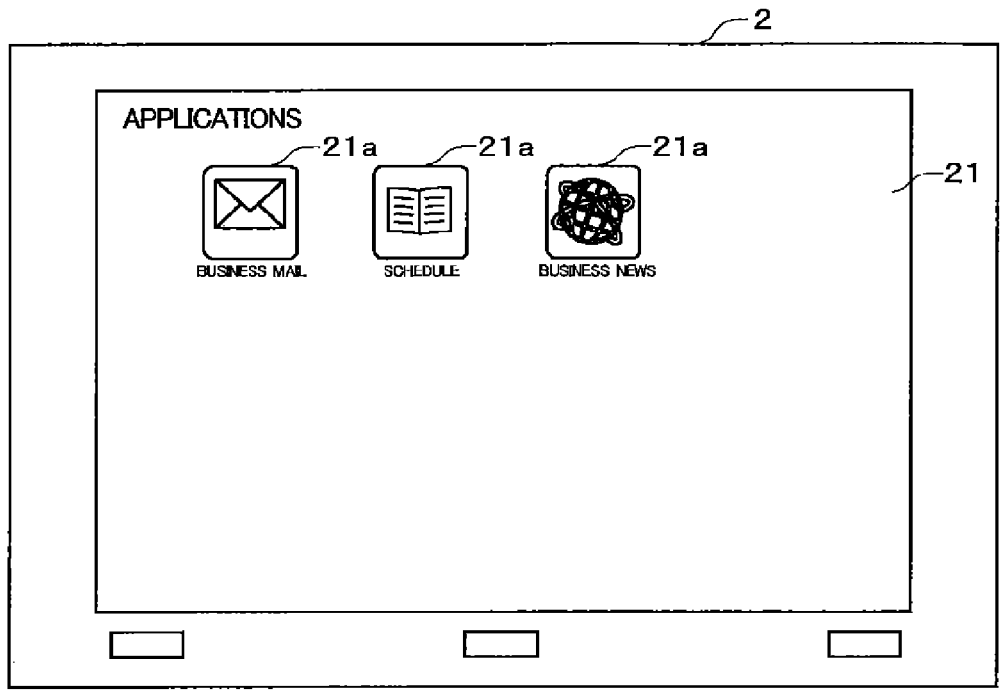
FIG. 9 shows a different example of an application selection screen.
Figure 10:
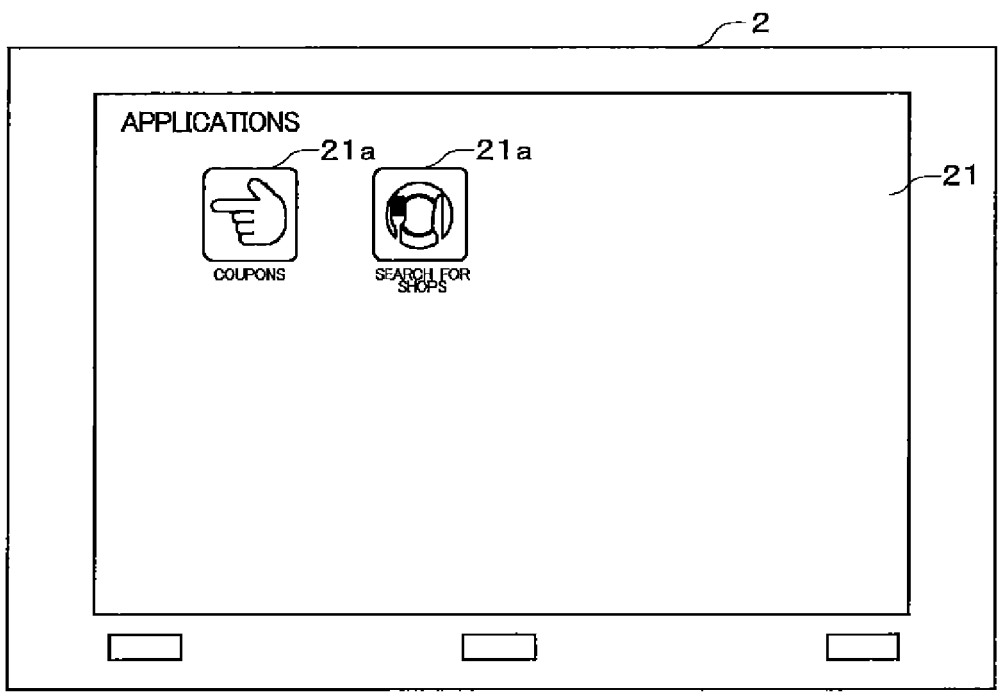
FIG. 10 shows another different example of an application selection screen.

FIG. 9 shows an example of an application selection screen in a case where a "purpose of use" of the vehicle 5 is commutation. On the application selection screen shown in FIG. 9, only the icons 21*a* of the applications for business mail, schedule, and business news which are the information-related applications 25*b* necessary for commutation are displayed. Also, FIG. 10 shows an example of an application selection screen in a case where a "purpose of use" of the vehicle 5 is shopping. On the application selection screen show in FIG. 10, only the icons 21*a* of the applications for acquisition of coupons and search for shops which are the information-related applications 25*b* necessary for shopping are displayed.

As described above, only the icons 21*a* of the information-related applications 25*b* necessary for a "purpose of use" of the vehicle 5 appear on an application selection screen. Hence, a user can easily find out the icon 21*a* of the information-related application 25*b* that the user desires to execute, in an application selection screen.

In the meantime, though the execution inhibition unit 206 inhibits execution of non-selected information-related applications 25*b* in the above-described manner, the execution inhibition unit 206 does not inhibit execution of the driving-related applications 25*a* and permits execution of all the driving-related applications 25*a*. Accordingly, guide information and functions regarding driving of the vehicle 5 can be reliably provided to a user, irrespective of a "purpose of use" of the vehicle 5.

Thereafter, the application execution unit 207 observes whether or not conditions for execution are satisfied, or whether or not instructions for execution are given by a user, regarding only the information-related applications 25*b* which are selected by the application selection unit 205 and are permitted to be executed (step S17). Then, if conditions for execution are satisfied or instructions for execution are given by a user, for any of the information-related applications 25*b* which are permitted to be executed ("Yes" in the step S17), the application execution unit 207 executes (starts) an applicable one of the information-related applications 25*b* (step S18).

Further, in a case where a destination of the vehicle 5 is set ("Yes" in a step S19), the finishing unit 208 determines whether or not the vehicle 5 arrives at the destination based on the position of the vehicle 5 which is acquired by the information acquisition unit 201 (step S20). Additionally, also in a case where a destination of the vehicle 5 can be estimated based on a "purpose of use" or the like, whether or not the vehicle 5 arrives at the estimated destination may be determined in the same way. For example, in a case where a "purpose of use" is commutation, a destination of the vehicle 5 can be estimated to be the office. Then, when the vehicle 5 arrives at a destination, the finishing unit 208 erases the application selection information 20*a* from the storage unit 25 (step S22).

On the other hand, in a case where a destination of the vehicle 5 is not set ("No" in the step S19), the finishing unit 208 determines whether or not the vehicle-mounted system 2 stops operating based on a status of the power-supply line 59 which is acquired by the information acquisition unit 201 (step S21). The finishing unit 208 determines that the vehicle-mounted system 2 will stop operating soon when the power-supply line 59 becomes non-energized. Then, in a case where the vehicle-mounted system 2 stops operating, the finishing unit 208 erases the application selection information 20*a* from the storage unit 25 just before the vehicle-mounted system 2 stops operating (step S22).

Because of the above-described processes of the finishing unit 208, the application selection information 20*a* is kept stored in the storage unit 25 until the vehicle 5 arrives at a destination in the case where a destination of the vehicle 5 is given. As the storage unit 25 is a non-volatile storage device, the application selection information 20*a* is kept stored in the storage unit 25 even if the vehicle-mounted system 2 stops operating.

Further, in a case where the application selection information 20*a* remains stored in the storage unit 25 after the vehicle-mounted system 2 is actuated, the processes of specifying a "purpose of use" and selecting the information-related applications 25*b* which are suitable for the estimated "purpose of use" (steps S13, S14, and S15) are omitted as described above. Accordingly, even if the vehicle-mounted system 2 stops operating, the application selection unit 205 does not change the selected information-related applications 25*b* until the vehicle 5 arrives at the destination.

Assume that a "purpose of use" is estimated and the information-related applications 25*b* which are suitable for the specified "purpose of use" are selected every time the vehicle-mounted system 2 is actuated. In this case, if the vehicle 5 is temporarily parked in a place other than a destination, a position or the like of the vehicle 5 would be different from a departure place when the vehicle-mounted system 2 is re-actuated, so that there is a possibility that a proper "purpose of use" cannot be specified. In contrast thereto, in the vehicle-mounted system 2 according to the first preferred embodiment of the present invention, the selected information-related applications 25*b* are not changed until the vehicle 5 arrives at a destination. Hence, the information-related applications 25*b* suitable for a proper "purpose of use" can be continuously executed until the vehicle 5 arrives at the destination even if the vehicle 5 is temporarily parked in a place other than the destination.

<1-5. Selection of Display Device>

In the vehicle-mounted system 2, numerous applications including the driving-related applications 25*a* and the information-related application 25*b* are executed in parallel. Hence, in some cases, a plurality of applications executed in parallel provide guide information to a user around the same time. For example, there may probably be a case where the information-related application 25*b* for information about parking area provides guide information indicating a crowding level of a parking area to a user at the substantially same time when the driving-related application 25*a* for detection of pedestrians provides guide information indicating the presence of a pedestrian to the user.

In such a case as described above where there are plural pieces of guide information which should be provided to a user around the same time, the display determination unit 209 (refer to FIG. 7) determines which display devices should respectively display the plural pieces of guide information, out of the head-up display 51, the meter display 52, the display 21 of the vehicle-mounted system 2, and the mirror display 53. Then, the display determination unit 209 causes selected display devices to display the guide information.

Priorities are assigned to pieces of guide information offered by the applications, respectively. Under normal conditions, pieces of guide information offered by the driving-related applications. 25*a* have higher priorities, and pieces of guide information offered by the information-related applications 25*b* have lower priorities. The display determination unit 209 compares the respective priorities of plural pieces of guide information which should be provided to a user, and causes the display devices to respectively display the plural pieces of guide information in order of priorities such that pieces of guide information of higher priorities can be displayed on display devices which are easier for a user to see.

For instance, assume that there are four pieces of guide information which should be provided to a user. In this case, the display determination unit 209 causes the head-up display 51, the meter display 52, the display 21 of the vehicle-mounted system 2, and the mirror display 53 to display a piece of guide information having the highest priority, a piece of guide information having the second highest priority, a piece of guide information having the third highest priority, and a piece of guide information having the lowest priority, respectively.

The display determination unit 209 determines which display devices should respectively display plural pieces of guide information, according to the priorities, so that guide information of higher priorities can be provided to a user via display devices which are easier for the user to see.

As described above, in the communications system 100 according to the first preferred embodiment of the present invention, the use specifying unit 204 specifies a "purpose of use" of the vehicle 5, and the application selection unit 205 selects one or more information-related applications 25*b* which are suitable for the "purpose of use" from the plurality of information-related applications 25*b*. Then, the execution inhibition unit 206 inhibits execution of the information-related applications 25*b* which are not selected by the application selection unit 205, out of the plurality of information-related applications 25*b*. Thus, it is possible to prevent the information-related applications 25*b* which are unnecessary for a "purpose of use" of the vehicle 5 from being executed wastefully.

Also, the use specifying unit 204 estimates a "purpose of use" based on information about the vehicle 5 before running, which eliminates a need of complicated operations of a user for specifying a "purpose of use" of the vehicle 5.

Further, the application execution unit 207 executes the driving-related applications 25*a* at a time when the vehicle 5 becomes ready to nm. On the other hand, the application execution unit 207 executes the information-related applications 25*b* after the use specifying unit 204 specifies a "purpose of use" of the vehicle 5. The application execution unit 207 executes the driving-related applications 25*a* at a time when the vehicle 5 becomes ready to run, so that guide information and functions regarding driving of the vehicle 5 can be speedily provided to a user.

2. Second Preferred Embodiment

Next, a second preferred embodiment of the present invention will be described. As the structure and operations of the communications system 100 according to the second preferred embodiment are much the same as those in the first preferred embodiment, the following description will deal mainly with differences from the first preferred embodiment.

Figure 11:
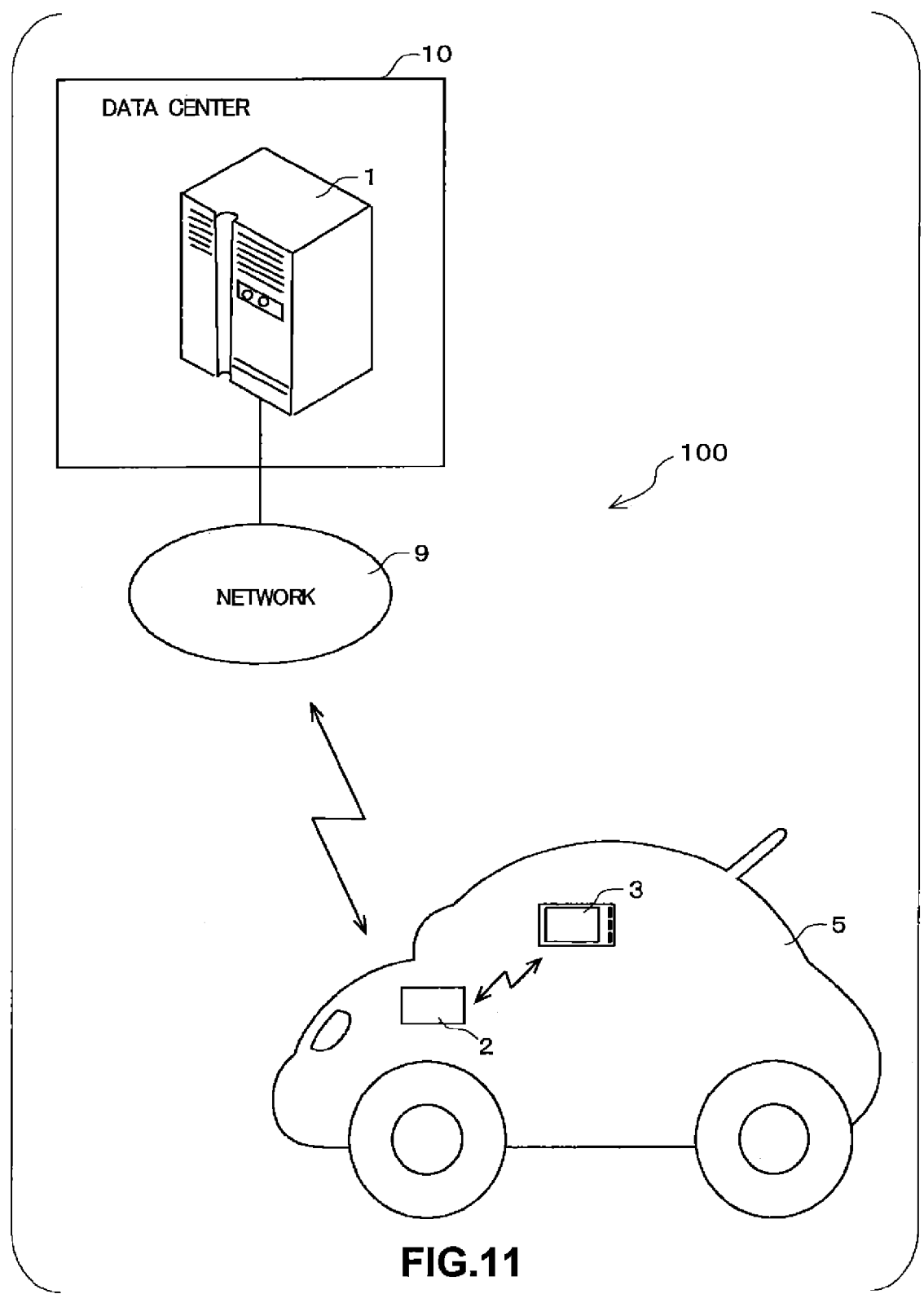
FIG. 11 is a schematic view of a communications system according to a second preferred embodiment.

FIG. 11 is a schematic view of the communications system 100 according to the second preferred embodiment. According to the second preferred embodiment, the vehicle-mounted system 2 can communicate with a mobile information terminal 3 that a user carries onto the vehicle 5, such as a tablet terminal or smartphone. Then, the vehicle-mounted system 2 can further provide guide information offered by an application executed in the mobile information terminal 3 to a user. In the second preferred embodiment, also execution of such an application as executed in the mobile information terminal 3 is inhibited if the application is unnecessary for a "purpose of use" of the vehicle 5.

Figure 12:
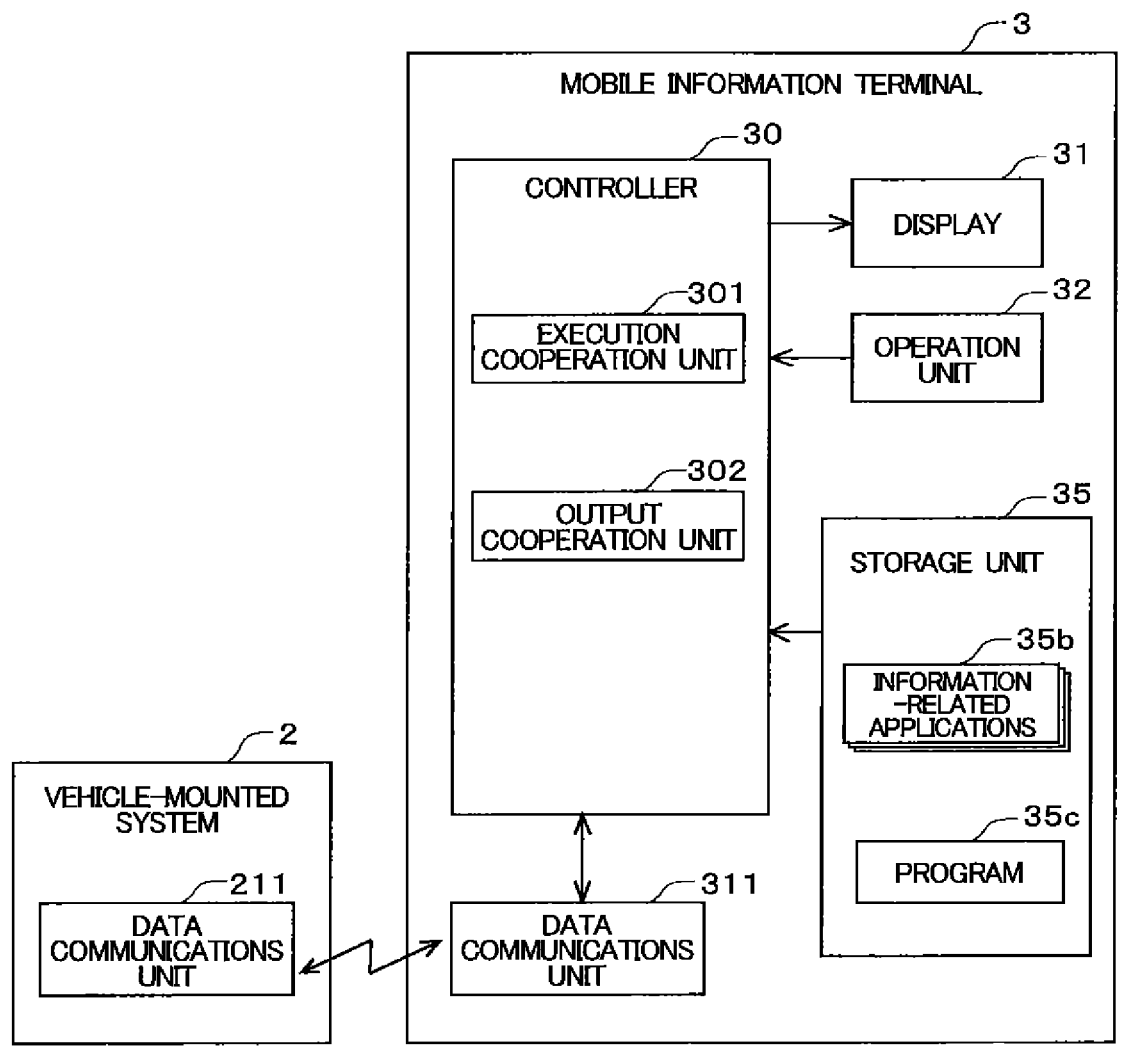
FIG. 12 shows a structure of a mobile information terminal.

FIG. 12 mainly shows a structure of the mobile information terminal 3. The mobile information terminal 3 includes a controller 30, a display 31, an operation unit 32, a storage unit 35, and a data communications unit 311. The controller 30 is a microcomputer which includes a CPU, a RAM, a ROM, and the like, and controls the whole of the mobile information terminal 3.

The display 31 is a display device for displaying various kinds of images. The operation unit 32 is a member for accepting a user's operation. The operation unit 32 includes an operation button that a user can physically operate and a touch panel overlaid on a screen of the display 31.

The data communications unit 311 has a communications capability of carrying out communications at short range using wireless communications standards such as Bluetooth (registered trademark). The vehicle-mounted system 2 according to the second preferred embodiment includes a data communications unit 211 having a communications capability compliant with the same communications standards as the data communications unit 311, in addition to the structure shown in FIG. 2. Accordingly, transmission and reception of data between the vehicle-mounted system 2 and the mobile information terminal 3 is made possible by the data communications units 211 and 311.

The storage unit 35 is a non-volatile storage device such as a flash memory, for example. In the storage unit 35, programs of information-related applications 35b which are driving-unrelated applications which are not related to driving of the vehicle 5 are stored. The information-related applications 35b are applications installed in the mobile information terminal 3, and are executable in the mobile information terminal 3. The information-related applications 35b include a plurality of applications.

Further, in the storage unit 35, a program 35c for control is stored. The CPU of the controller 30 executes the program 35c (in other words, carries out a calculation process in accordance with the program 35c), to thereby implement various functional elements which are required to form the controller 30. An execution cooperation unit 301 and an output cooperation unit 302 shown in FIG. 12 are functional elements of the controller 30 which are implemented by execution of the program 35c for control. The execution cooperation unit 301 and the output cooperation unit 302 perform processes required for cooperation with the vehicle-mounted system 2.

Figure 13:
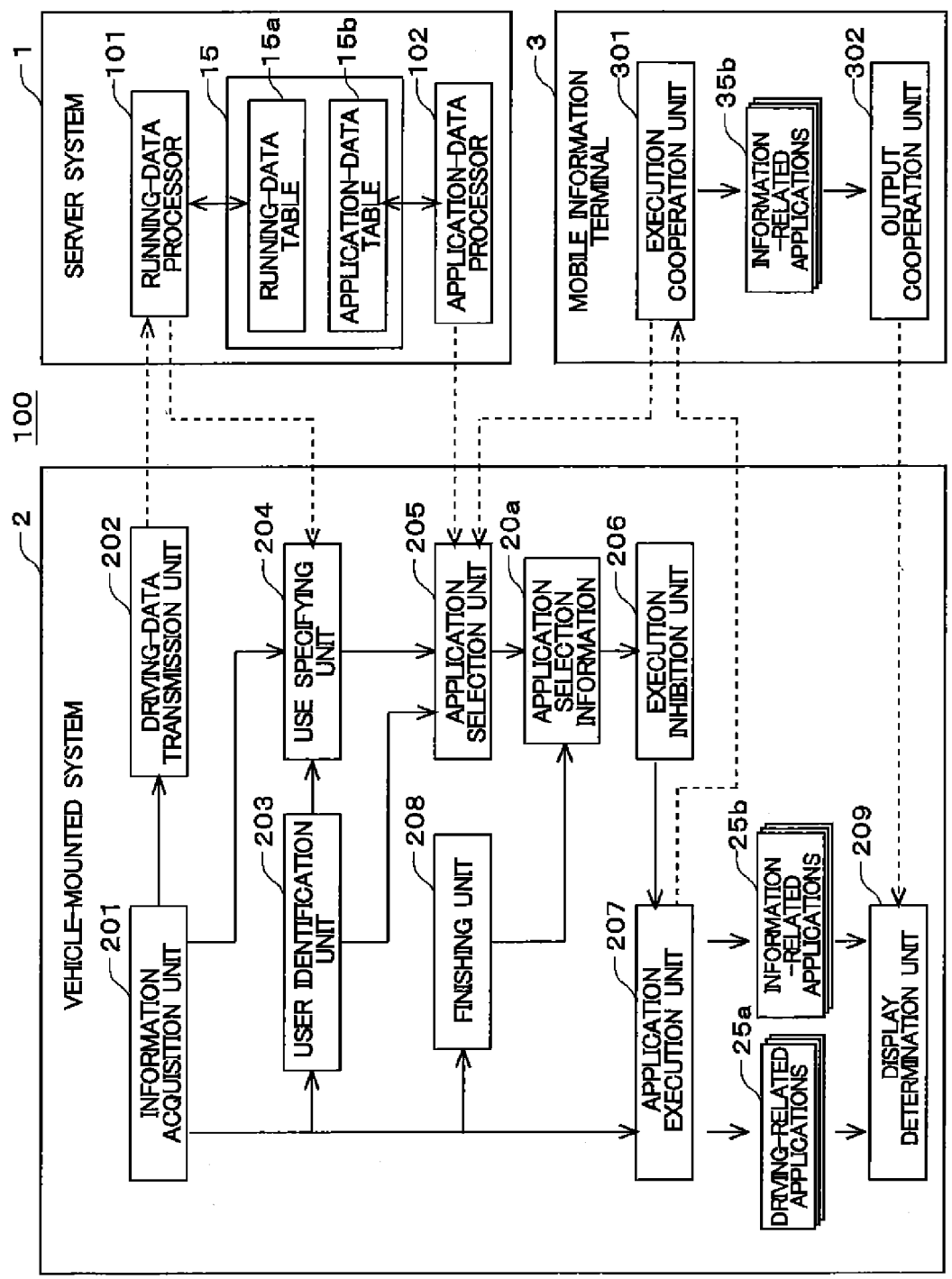
FIG. 13 is a functional diagram of a structure of the communications system according to the second preferred embodiment.

FIG. 13 is a functional diagram of a structure of the communications system 100, including the functional elements of the controller 30 which are implemented by execution of the program 35c for control in the mobile information terminal 3.

The respective functional elements of the vehicle-mounted system 2 shown in FIG. 13 perform processes which are much the same as those in the first preferred embodiment. However, the functional elements of the vehicle-mounted system 2 shown in FIG. 13 perform processes on not only the driving-related applications 25a and the information-related applications 25b installed in the vehicle-mounted system 2, but also the information-related applications 35b installed in the mobile information terminal 3.

The application selection unit 205 selects one or more information-related applications 25b, 35b which are suitable for a "purpose of use", from the plurality of information-related applications 25b installed in the vehicle-mounted system 2 and the information-related applications 35b installed in the mobile information terminal 3. Data identifying the information-related applications 35b installed in the mobile information terminal 3 is transferred from the execution cooperation unit 301 of the mobile information terminal 3 to the application selection unit 205.

The execution inhibition unit 206 inhibits execution of non-selected information-related applications 25b, 35b which are not selected by the application selection unit 205 based on the application selection information 20a, and permits execution of the information-related applications 25b, 35b which are selected by the application selection unit 205. Applications having the possibility that execution thereof is inhibited include also the information-related applications 35b of the mobile information terminal 3.

Further, the application execution unit 207 executes any of the information-related applications 25b, 35b which are selected by the application selection unit 205 and permitted to be executed, if conditions for execution thereof are satisfied, or instructions for execution thereof are given by a user. In a case where an application which is to be executed is the information-related application 35b, the application execution unit 207 transmits an instruction signal which gives instructions for execution of the information-related application 35b, to the mobile information terminal 3. In response to the instruction signal, the execution cooperation unit 301 of the mobile information terminal 3 executes the information-related application 35b which is designated.

Moreover, in a case where there is guide information offered by the information-related applications 35b executed in the mobile information terminal 3, the output cooperation unit 302 of the mobile information terminal 3 transmits the guide information to the vehicle-mounted system 2. The display determination unit 209 determines which of display devices should display the guide information of the information-related applications 35b executed in the mobile information terminal 3, and causes the display device as determined to display the guide information. The display determination unit 209 determines which of display devices should display the guide information also in consideration of the priority of the guide information of the information-related applications 35b.

As described above, in the second preferred embodiment, the application selection unit 205 selects one or more information-related applications 25b, 35b which are suitable for a "purpose of use", from the information-related applications 25b, 35b which are executable in either the vehicle-mounted system 2 or the mobile information terminal 3. Then, the execution inhibition unit 206 inhibits execution of the information-related applications 25b, 35b which are not selected by the application selection unit 205, out of the plurality of information-related applications 25b, 35b. Thus, it is possible to prevent also the information-related applications 35b executable in the mobile information terminal 3 from being executed wastefully if the information-related applications 35b are unnecessary for a "purpose of use of the vehicle 5.

3. Modifications

While the preferred embodiments of the present invention have been described hereinbefore, the present invention is not limited to the above-described preferred embodiments, and various modifications are possible. Below, modifications will be described. All preferred embodiments including the above-described embodiments and the following embodiments can be combined with one another as appropriate.

Though the vehicular system used in the vehicle 5 is the vehicle-mounted system 2 mounted onto the vehicle 5 in the above-described preferred embodiments, the vehicular system used in the vehicle 5 may be a mobile information terminal that a user carries onto the vehicle 5, such as a tablet terminal or a smartphone.

Also, though a user of the vehicular system is a driver in the above-described preferred embodiments, a user of the vehicular system may be a fellow passenger riding in the vehicle 5, other than a driver.

Also, though the use specifying unit 204 estimates a "purpose of use" of the vehicle 5 based on information about the vehicle 5 before running in the above-described preferred embodiments, the use specifying unit 204 may specify a "purpose of use" of the vehicle 5 in the other way, that is, based on a user's operations or interaction with a user.

Also, the application selection unit 205 selects an application which is to be permitted to be executed based on only a "purpose of use" of the vehicle 5 in the above-described preferred embodiments. Unlike this, the application selection unit 205 may select an application which is to be permitted to be executed also in consideration of other factors such as a destination, a route to a destination, a fellow passenger, and a time period, together with a "purpose of use" of the vehicle 5.

Also, though whether or not the vehicle 5 is ready to run is determined based on a status of the power-supply line 59 (as to whether or not an engine starts) in the above-described preferred embodiments, whether or not the vehicle 5 is ready to run may be determined in the other way. For example, in a case where a vehicle is an electric car, whether or not the vehicle is ready to run can be determined depending on whether a running system is actuated or not.

Also, in the above-described preferred embodiments, the execution inhibition unit 206 controls the application execution unit 207 such that non-selected information-related applications 25b are not executed, and further controls the display 21 such that the icons 21a of the non-selected information-related applications 25b are not displayed Unlike this, the execution inhibition unit 206 may alternatively inhibit execution of an application by only controlling the display 21 such that the icons 21a of non-selected information-related applications 25b are not displayed.

Also, an application of which execution is inhibited may be processed such that the application can be again executed upon a user's specific operation such as input of commands, instead of being brought into a state where the application cannot be executed in any way.

Also, a part or a whole of the functional elements and data furnished in the vehicle-mounted system 2 in the above-described preferred embodiments may be furnished in the server system 1. For example, the server system 1 may be furnished with functional elements which perform the same processes as those performed by the use specifying unit 204 or the application selection unit 205 of the above-described preferred embodiments.

Contrary to this, a part or a whole of the functional elements and data furnished in the server system 1 in the above-described preferred embodiments may be furnished in the vehicular system. The functions implemented by cooperation of the server system 1 and the vehicle-mounted system 2 in the above-described preferred embodiments may be implemented solely in the vehicular system.

Also, the load of the processes performed by one functional element of the vehicle-mounted system 2 in the above-described preferred embodiments may be shared by the server system 1 and the vehicle-mounted system 2. For example, in order to specify a "purpose of use" of the vehicle 5, the functional element of the server system 1 estimates a "purpose of use" of the vehicle 5 based on the running-data table 15a, and the functional element of the vehicle-mounted system 2 specifies a "purpose of use" of the vehicle 5 based on a result of the estimation.

Also, a whole or a part of the functions which are implemented by software processing as a result of execution of a program in the above-described preferred embodiments may be implemented by an electric hardware circuit. On the other hand, a whole or a part of the functions which are implemented by a hardware circuit in the above-described preferred embodiments may be implemented by software processing. Further, the function which has been described as a single block in the above preferred embodiments may be implemented by cooperation of software and hardware.

While the invention has been shown and described in detail, the foregoing description is in all aspects illustrative and not restrictive. It is therefore understood that numerous modifications and variations can be devised without departing from the scope of the invention.

What is claimed is:

1. A vehicular system used in a vehicle, the vehicular system comprising:
a controller configured to (i) specify a purpose of use being made of the vehicle by a user of the vehicle, (ii) select one or more applications which are suitable for the specified purpose of use of the vehicle, from a plurality of applications, and (iii) inhibit execution of applications which are not selected to be suitable for the specified purpose of use of the vehicle, out of the plurality of applications, wherein
the controller determines which ones of a plurality of display devices should respectively display plural pieces of guide information offered by executed applications, according to respective priorities of the plural pieces of guide information.

2. The vehicular system according to claim 1, wherein the controller estimates the purpose of use of the vehicle based on information about the vehicle before running of the vehicle.

3. The vehicular system according to claim 1, further comprising
a display that displays icons which receive a user's instructions for execution of the plurality of applications, wherein
the controller does not allow the display to display the icons of the applications which are not selected to be suitable for the specified purpose of use of the vehicle.

4. The vehicular system according to claim 1, wherein
the plurality of applications include driving-related applications which are related to driving of the vehicle and driving-unrelated applications which are not related to driving of the vehicle, and
the controller does not inhibit execution of the driving-related applications and inhibits execution of some of the driving-unrelated applications which are not selected to be suitable for the specified purpose of use of the vehicle.

5. The vehicular system according to claim 4, wherein
the controller executes the driving-related applications at a time when the vehicle becomes ready to run, and executes the driving-unrelated applications after the purpose of use of the vehicle has been specified.

6. The vehicular system according to claim 1, wherein
the controller determines whether or not the vehicle arrives at a destination, and
the controller does not change the one or more selected applications until the vehicle arrives at the destination.

7. A communications system including a server system and a vehicular system used in a vehicle, the communications system comprising:
a controller configured to (i) specify a purpose of use being made of the vehicle by a user of the vehicle, (ii) select one or more applications which are suitable for the specified purpose of use of the vehicle, from a plurality of applications, and (iii) inhibit execution of applications which are not selected to be suitable for the specified purpose of use of the vehicle, out of the plurality of applications, wherein
the controller determines which ones of a plurality of display devices should respectively display plural pieces of guide information offered by executed applications, according to respective priorities of the plural pieces of guide information.

8. A communications system including a vehicle-mounted system mounted onto a vehicle and a mobile information terminal, the communications system comprising:
a controller configured to (i) specify a purpose of use being made of the vehicle by a user of the vehicle, (ii) select one or more applications which are suitable for the specified purpose of use of the vehicle, from a plurality of applications which are executable in either the vehicle-mounted system or the mobile information terminal, and (iii) inhibit execution of applications which are not selected to be suitable for the specified purpose of use of the vehicle, out of the plurality of applications, wherein
the controller determines which ones of a plurality of display devices should respectively display plural pieces of guide information offered by executed applications, according to respective priorities of the plural pieces of guide information.

9. A computer-implemented method of executing an application in a vehicle, the method comprising the steps of:
(a) specifying a purpose of use being made of the vehicle by a user of the vehicle;
(b) selecting one or more applications which are suitable for the specified purpose of use of the vehicle, from a plurality of applications;
(c) inhibiting execution of applications which are not selected in the step (b) to be suitable for the specified purpose of use of the vehicle, out of the plurality of applications, wherein the inhibiting execution of applications includes inhibiting displaying of icons associated with the applications inhibited from execution on an application selection screen of a display within the vehicle, and wherein icons associated with the applications which are suitable for the specified purpose of use of the vehicle are displayed on the application selection screen of the display within the vehicle; and
(d) determining which ones of a plurality of display devices should respectively display plural pieces of guide information offered by executed applications, according to respective priorities of the plural pieces of guide information.

10. The method according to claim 9, wherein
in the step (a), the specified purpose of use of the vehicle is estimated based on information about the vehicle before running of the vehicle.

11. The method according to claim 9, wherein
the plurality of applications includes driving-related applications which are related to driving of the vehicle and driving-unrelated applications which are not related to driving of the vehicle, and
in the step (c), execution of the driving-related applications is not inhibited and execution of some of the driving-unrelated applications which are not selected in the step (b) to be suitable for the specified purpose of use of the vehicle is inhibited.

12. The method according to claim 11, further comprising the steps of:
(e) executing the driving-related applications at a time when the vehicle becomes ready to run; and
(f) executing the driving-unrelated applications after the purpose of use of the vehicle is specified in the step (a).

13. The method according to claim 9, further comprising the step of
(g) determining whether or not the vehicle arrives at a destination, wherein the one or more selected applications are not changed until the vehicle arrives at the destination in the step (b).

* * * * *